(12) United States Patent
Beck et al.

(10) Patent No.: US 8,944,953 B2
(45) Date of Patent: Feb. 3, 2015

(54) MULTISTEP GEAR MECHANISM

(75) Inventors: Stefan Beck, Eriskirch (DE); Gerhard Gumpoltsberger, Friedrichshafen (DE); Christian Sibla, Friedrichshafen (DE); Michael Wechs, Lindau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/995,787

(22) PCT Filed: Nov. 21, 2011

(86) PCT No.: PCT/EP2011/070518
§ 371 (c)(1),
(2), (4) Date: Jun. 19, 2013

(87) PCT Pub. No.: WO2012/084374
PCT Pub. Date: Jun. 28, 2012

(65) Prior Publication Data
US 2013/0267369 A1   Oct. 10, 2013

(30) Foreign Application Priority Data

Dec. 21, 2010   (DE) .......................... 10 2010 063 643

(51) Int. Cl.
*F16H 3/66*        (2006.01)
*F16H 3/62*        (2006.01)

(52) U.S. Cl.
CPC .. *F16H 3/62* (2013.01); *F16H 3/66* (2013.01); *F16H 2200/0065* (2013.01); *F16H 2200/2012* (2013.01); *F16H 2200/2046* (2013.01)
USPC ............................ 475/275; 475/286; 475/296

(58) Field of Classification Search
None
See application file for complete search history.

(56) References Cited

U.S. PATENT DOCUMENTS

| 4,395,925 A | 8/1983 | Gaus |
| 6,634,980 B1 | 10/2003 | Ziemer |

(Continued)

FOREIGN PATENT DOCUMENTS

| DE | 29 36 969 A1 | 4/1981 |
| DE | 199 49 507 A1 | 4/2001 |

(Continued)

OTHER PUBLICATIONS

Gerhard Gumpoltsberger, "Systematic Synthesis and Evaluation of Multi-stage Planetary Transmissions" Mechanical Engineering of the Technical University of Chemnitz, Jan. 22, 2007.

(Continued)

*Primary Examiner* — Gene Crawford
*Assistant Examiner* — Mark Manley
(74) *Attorney, Agent, or Firm* — Davis & Bujold, PLLC; Michael J. Bujold

(57) ABSTRACT

The transmission has four planetary gear sets and shafts and shift elements. Sun gear of the planetary gearset (P1) couples shaft (5) which couples ring gear of gearset (P3) and is connectable, via clutch (58), to shaft (8), which couples carrier of gearset (P2) and is connectable, via clutch (89), to shaft (9), which couples sun gears of gearsets (P3, P4). Carrier of gearset (P1) couples drive shaft (1), which is connectable, via clutch (16), to shaft (6), which couples ring gear of gearset (P2). Sun gear of gearset (P2) couples shaft (3), which couples carrier of gearset (P3) and is connectable to the housing via brake (03). Ring gear of gearset (P4) couples shaft (4) which is connectable to the housing via brake (04). Output shaft (2) couples carrier of gearset (P4) and is connectable, via clutch (27), to shaft (7) which couples ring gear of gearset (P1).

10 Claims, 1 Drawing Sheet

(56) References Cited

U.S. PATENT DOCUMENTS

| | | |
|---|---|---|
| 7,341,537 B2 | 3/2008 | Klemen |
| 7,549,942 B2 | 6/2009 | Gumpoltsberger |
| 7,695,398 B2 | 4/2010 | Phillips et al. |
| 7,699,743 B2 | 4/2010 | Diosi et al. |
| 8,210,981 B2 | 7/2012 | Bauknecht et al. |
| 8,277,356 B2 | 10/2012 | Hart et al. |
| 2004/0242368 A1* | 12/2004 | Tabata et al. ............... 475/296 |
| 2005/0215386 A1 | 9/2005 | Haka |
| 2007/0072732 A1 | 3/2007 | Klemen |
| 2008/0274853 A1 | 11/2008 | Raghavan |
| 2009/0017965 A1 | 1/2009 | Phillips et al. |
| 2009/0023541 A1* | 1/2009 | Phillips et al. ............... 475/276 |
| 2009/0054194 A1 | 2/2009 | Phillips et al. |
| 2009/0192009 A1* | 7/2009 | Phillips et al. ............... 475/275 |
| 2010/0210393 A1* | 8/2010 | Phillips et al. ............... 475/275 |
| 2010/0216589 A1* | 8/2010 | Hart et al. ............... 475/275 |

FOREIGN PATENT DOCUMENTS

| | | |
|---|---|---|
| DE | 10 2005 010 210 A1 | 9/2006 |
| DE | 10 2006 024 442 A1 | 11/2006 |
| DE | 10 2005 032 884 A1 | 1/2007 |
| DE | 10 2006 006 637 A1 | 9/2007 |
| DE | 10 2008 015 919 A1 | 10/2008 |
| DE | 10 2008 019 136 A1 | 11/2008 |
| DE | 10 2008 031 970 A1 | 1/2009 |
| DE | 10 2008 000 428 A1 | 9/2009 |
| DE | 10 2009 047 277 A1 | 6/2011 |
| DE | 10 2009 047 278 A1 | 6/2011 |
| JP | 2001-041296 A | 2/2001 |
| JP | 2006-266389 A | 10/2006 |
| JP | 2008-215407 A | 9/2008 |
| JP | 2009-270667 A | 11/2009 |

OTHER PUBLICATIONS

German Search Report Corresponding to 10 2010 063 670.3 mailed Aug. 22, 2011.

German Search Report Corresponding to 10 2010 063 643.6 mailed Aug. 22, 2011.

German Search Report Corresponding to 10 2010 063 632.0 mailed Dec. 14, 2011.

German Search Report Corresponding to 10 2010 063 634.7 mailed Dec. 14, 2011.

International Search Report Corresponding to PCT/EP2011/070517 mailed Jan. 27, 2012.

International Search Report Corresponding to PCT/EP2011/070518 mailed Jan. 27, 2012.

International Search Report Corresponding to PCT/EP2011/070519 mailed Mar. 1, 2012.

International Search Report Corresponding to PCT/EP2011/070521 mailed Mar. 2, 2012.

Written Opinion Corresponding to PCT/EP2011/070517 mailed Jan. 27, 2012.

Written Opinion Corresponding to PCT/EP2011/070518 mailed Jan. 27, 2012.

Written Opinion Corresponding to PCT/EP2011/070519 mailed Mar. 1, 2012.

Written Opinion Corresponding to PCT/EP2011/070521 mailed Mar. 2, 2012.

* cited by examiner

| Gear | Engaged shift elements ||||||  Transmission ratio i | Gear increment φ |
|---|---|---|---|---|---|---|---|---|
| | Brake || Clutch ||||||
| | 03 | 04 | 16 | 27 | 58 | 89 | | |
| 1 | × | × | × | | | × | 5.605 | 1.625 |
| 2 | | × | × | | × | × | 3.449 | 1.382 |
| 3 | | × | × | × | | × | 2.496 | 1.431 |
| 4 | | × | | × | × | × | 1.744 | 1.464 |
| 5 | | × | × | × | × | | 1.191 | 1.191 |
| 6 | | | × | × | × | × | 1.000 | 1.168 |
| 7 | × | | × | × | × | | 0.856 | 1.230 |
| 8 | × | | | × | × | × | 0.696 | 1.117 |
| 9 | × | | × | × | | × | 0.623 | Total |
| R | × | × | × | | × | | −3.503 | 8.992 |

MULTISTEP GEAR MECHANISM

This application is a National Stage completion of PCT/EP2011/070518 filed Nov. 21, 2011, which claims priority from German patent application serial no. 10 2010 063 643.6 filed Dec. 21, 2010.

FIELD OF THE INVENTION

The present invention relates to a multi-stage transmission of a planetary design, in particular for a motor vehicle.

BACKGROUND OF THE INVENTION

According to the prior art, multi-stage transmissions of a planetary design, in particular for motor vehicles, comprise planetary gear sets that are shifted using friction elements or shift elements such as clutches and brakes, and typically are connected to a start-up element, such as a hydrodynamic torque converter or a fluid coupling, that is subject to a slip effect and is provided optionally with a lock-up clutch.

Such a multi-stage transmission is known, for example, from the applicant's DE 199 49 507 A1, according to which two non-shiftable front-mounted gear sets are provided on the drive shaft that generate two rotational speeds on the output side and which, in addition to acting on the rotational speed of the drive shaft, can be selectively meshed with a shiftable double planetary gear set acting on the output shaft by selective engagement of the shift elements that are used such that only one of the two currently actuated shift elements must be engaged or disengaged to shift from one gear to the next higher or lower gear.

By using five shift elements, seven forward gears are obtained; by using six shift elements, nine or ten forward gears are obtained.

Furthermore, a nine-speed multi-stage transmission is known from DE 29 36 969 A1; it comprises eight shift elements and four planetary gear sets, wherein one planetary gear set serves as a front-mounted gear set and the main gearing includes a Simpson set and a further planetary gear set serving as reverse gearing.

Further multi-stage transmissions are known, for example, from the applicant's DE 10 2005 010 210 A1 and DE 10 2006 006 637 A1.

Automatically shiftable vehicle transmissions of a planetary design are already generally described numerous times in the prior art and are continually undergoing further development and improvement. As such, these transmissions should have a relatively simple design, in particular requiring a low number of shift elements, and minimize the need for double shifting, i.e. engaging and disengaging two shift elements, when sequential shifting is performed, thereby ensuring that only one shift element is ever switched when shifting is performed in defined groups of gears.

The applicant's document DE 10 2008 000 428 A1 discloses a multi-stage transmission of a planetary design that includes an input shaft and an output shaft which are disposed in a housing. The known transmission includes at least four planetary gear sets, which are designated in the following as the first, second, third, and fourth planetary gear sets, at least eight rotatable shafts, which are designated in the following as the drive shaft, output shaft, third, fourth, fifth, sixth, seventh, and eighth shafts, and at least six shift elements, comprising brakes and clutches, the selected engagement of which produces different transmission ratios between the input shaft and the output shaft, such that, preferably, nine forward gears and one reverse gear can be obtained.

The first and second planetary gear sets, which are preferably designed as minus planetary gear sets, i.e., having a negative stationary transmission ratio, form a shiftable front-mounted gear set, wherein the third and fourth planetary gear sets form a main gear set.

In the known multi-stage transmission, the carriers of the first and second planetary gear sets are coupled together via the fourth shaft, which is connected to an element of the main gear set, the ring gear of the first planetary gear set is coupled to the sun gear of the second planetary gear set via the eighth shaft, which is detachably connectable to the drive shaft via a first clutch, and the sun gear of the first planetary gear set can be coupled, via a first brake, to a housing of the transmission by means of the third shaft, and is detachably connectable to the drive shaft via a second clutch, wherein the ring gear of the second planetary gear set can be coupled, via a second brake, to a housing of the transmission by means of the fifth shaft. In addition, the seventh shaft is permanently connected to at least one element of the main gear set, and can be coupled, via a third brake, to the housing of the transmission, wherein the sixth shaft is permanently connected to at least one further element of the main gear set and is detachably connectable via a third clutch to the drive shaft; the output shaft is permanently connected to at least one further element of the main gear set.

In the known transmission, the fourth shaft is preferably permanently connected to the ring gear of the third planetary gear set, wherein the sixth shaft is permanently connected to the ring gear of the fourth planetary gear set and to the carrier of the third planetary gear set, and is detachably connectable, via the third clutch, to the drive shaft. Furthermore, the seventh shaft is permanently connected to the sun gears of the third and fourth planetary gear sets, and can be coupled, via the third brake, to a housing of the transmission. In this case, the output drive is produced via the output shaft, which is permanently connected to the carrier of the fourth planetary gear set. Furthermore, the third and fourth planetary gear sets can be combined or reduced to a Ravigneaux set having a common carrier and a common ring gear.

SUMMARY OF THE INVENTION

The problem addressed by the present invention is that of providing a multi-stage transmission of the initially described type, which has nine forward gears and one reverse gear having a sufficient transmission ratio, in which the design complexity and the overall size, in particular the overall length and the weight, are optimized, and in which efficiency is improved with respect to drag losses and gearing losses. In addition, in the multi-stage transmission according to the invention, minimal moments at the point of support should act on the shift elements. The transmission according to the invention should be suitable for longitudinal installation in particular, but also for transversal installation in the vehicle.

A multi-stage transmission of a planetary design according to the invention comprises an input shaft and an output shaft, which are disposed in a housing. In addition, there are provided at least four planetary gear sets, which are designated in the following as the first, second, third, and fourth planetary gear sets, nine rotatable shafts, which are designated in the following as the drive shaft, output shaft, third, fourth, fifth, sixth, seventh, eighth, and ninth shafts, and at least six shift elements comprising brakes and clutches, the selective engagement of which produces different transmission ratios between the drive shaft and the output shaft, such that, preferably, nine forward gears and one reverse gear can be obtained.

The planetary gear sets, viewed axially, are preferably disposed in the sequence of first planetary gear set, second planetary gear set, third planetary gear set, fourth planetary gear set, or first planetary gear set, second planetary gear set, fourth planetary gear set, third planetary gear set, and are preferably designed as minus planetary gear sets.

As is well known, a simple minus planetary gear set comprises a sun gear, a ring gear, and a carrier on which the planetary gears are rotatably supported, the planetary gears meshing with the sun gear and the ring gear. As a result, when the carrier is fixed, the ring gear has a direction of rotation that is opposite that of the sun gear. In contrast, a simple plus planetary gear set comprises a sun gear, a ring gear, and a carrier, on which inner and outer planet gears are rotatably supported, wherein all the inner planet gears mesh with the sun gear and all the outer planet gears mesh with the ring gear, and each inner planet gear meshes with only one outer planet gear. As a result, when the carrier is fixed, the ring gear has the same direction of rotation as the sun gear, and a positive stationary transmission ratio results.

According to the invention, the sun gear of the first planetary gear set is connected to the fifth shaft, which is connected to the ring gear of the third planetary gear set and is detachably connectable, via a first clutch, to the eighth shaft, which is connected to the carrier of the second planetary gear set and is detachably connectable, via a second clutch, to the ninth shaft, which is connected to the sun gear of the third planetary gear set and the sun gear of the fourth planetary gear set.

Furthermore, the carrier of the first planetary gear set is connected to the drive shaft, which is detachably connectable, via a third clutch, to the sixth shaft, which is connected to the ring gear of the second planetary gear set, wherein the sun gear of the second planetary gear set is connected to the third shaft, which is connected to the carrier of the third planetary gear set and can be coupled, via a first brake, to the housing of the transmission.

According to the invention, the ring gear of the fourth planetary gear set is connected to the fourth shaft, which can be coupled, via a second brake, to the housing of the transmission, wherein the output shaft is connected to the carrier of the fourth planetary gear set and is detachably connectable, via a fourth clutch, to the seventh shaft, which is connected to the ring gear of the first planetary gear set.

The embodiment of the multi-stage transmission according to the invention results in transmission ratios that are particularly suitable for passenger vehicles, and in a greater overall gear ratio of the multi-stage transmission, thereby improving driving smoothness and significantly reducing fuel consumption.

Furthermore, design complexity is significantly reduced with the multi-stage transmission according to the invention, due to a low number of shift elements. Using the multi-stage transmission according to the invention, it is advantageously possible to perform a start-up using a hydrodynamic converter, an external start-up clutch, or any other suitable external start-up element. It is also conceivable to perform a start-up procedure using a start-up element integrated in the transmission. Preferably, a shift element that is actuated in the first forward gear and in the reverse gear is suitable.

Moreover, the multi-stage transmission according to the invention results in good efficiency in the main drive gears with respect to drag losses and gearing losses.

Furthermore, low torques are present in the shift elements and in the planetary gear sets of the multi-stage transmission, thereby advantageously reducing wear in the multi-stage transmission. In addition, the low torques make it possible to utilize correspondingly low dimensions, thereby reducing the necessary installation space and related costs. Furthermore, the rotational speeds of the shafts, shift elements, and planetary gear sets are low.

The clutches and the brakes of the transmission can be preferably implemented as friction shift elements or lamellar shift elements, which have the advantage of being power-shiftable. However, shift elements, as defined by the invention, can also be implemented as form-locking shift elements, such as synchronized or unsynchronized claw clutches or brakes. A transmission according to the invention can exclusively comprise friction shift elements or a combination of friction shift elements and form-locking shift elements. In that case, form-locking shift elements are preferably utilized at points at which this shift element need not be engaged while subjected to a load, which can be the case, for example, in the start-up gears or in high ratio, high gears, in which a brief interruption of tractive force is tolerable without noticeable losses of comfort due to the low level of tractive force.

Due to the compact design of the transmission according to the invention, the transmission is suitable for a longitudinal installation and for a transversal installation in the vehicle.

In addition, the transmission according to the invention is designed to be adaptable to different drive train embodiments in terms of power flow direction and spatial aspects.

BRIEF DESCRIPTION OF THE DRAWINGS

The invention is described in greater detail in the following, as an example, with reference to the attached figures. They show.

DETAILED DESCRIPTION OF THE PREFERRED EMBODIMENTS

Figures 1, 2:
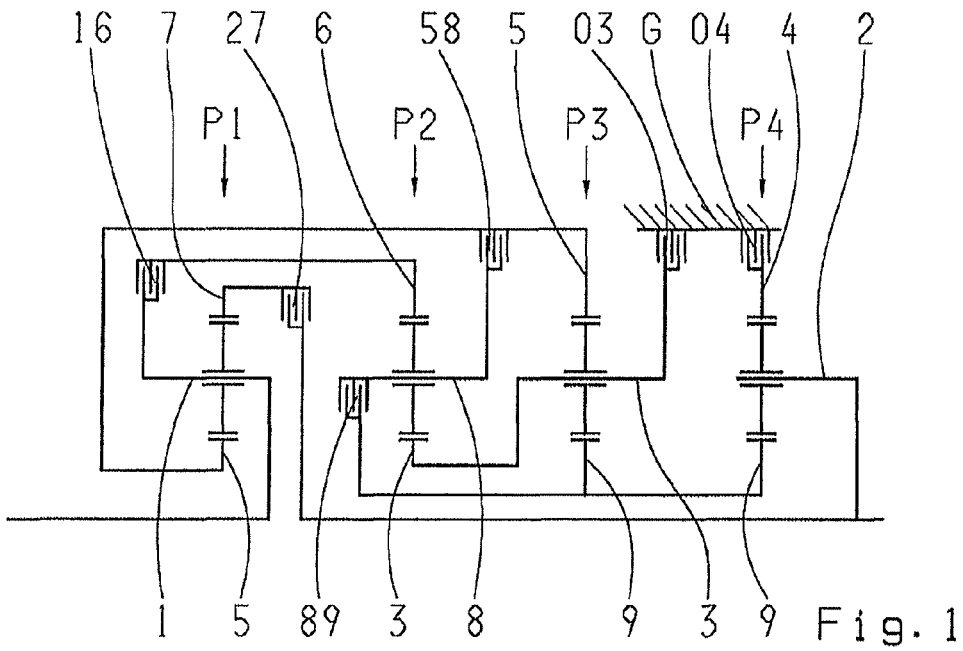
FIG. 1: a schematic view of a preferred embodiment of a multi-stage transmission according to the invention.
FIG. 2: an example of a shift pattern for a multi-stage transmission according to FIG. 1.

FIG. 1 shows a multi-stage transmission, according to the invention, which has a drive shaft 1, an output shaft 2, and four planetary gear sets P1, P2, P3 and P4, which are disposed in a housing G. Planetary gear sets P1, P2, P3 and P4, in the example shown in FIG. 1, are designed as minus planetary gear sets. According to the invention, at least one planetary gear set can be implemented as a plus planetary gear set if the carrier and ring gear connection are exchanged and, simultaneously, the value of the stationary transmission ratio is increased by 1 in comparison to the embodiment as a minus planetary gear set.

In the embodiment shown, the planetary gear sets, viewed axially, are disposed in the sequence P1, P2, P3 and P4.

As shown in FIG. 1, six shift elements are provided, namely two brakes 03, 04 and four clutches 16, 27, 58 and 89. The spatial disposition of the shift elements can be arbitrary, and is limited only by the dimensions of the outer design. The clutches and the brakes of the transmission are preferably implemented as friction shift elements or lamellar shift elements.

Selective shifting of nine forward gears and one reverse gear can be achieved using these shift elements. The multi-stage transmission according to the invention has a total of nine rotatable shafts, namely the shafts 1, 2, 3, 4, 5, 6, 7, 8 and 9, wherein the drive shaft is the first shaft, and the output shaft is the second shaft of the transmission.

According to the invention, in the multi-stage transmission according to FIG. 1, the sun gear of the first planetary gear set P1 is connected to the fifth shaft 5, which is connected to the ring gear of the third planetary gear set P3 and is detachably connectable, via a first clutch 58, to the eighth shaft 8, which is connected to the carrier of the second planetary gear set P2 and is detachably connectable, via a second clutch 89, to the ninth shaft 9, which is connected to the sun gear of the third planetary gear set P3 and the sun gear of the fourth planetary gear set P4.

According to the invention and as shown in FIG. 1, the carrier of the first planetary gear set P1 is connected to the drive shaft 1 of the transmission, which is detachably connected, via a third clutch 16, to the sixth shaft 6, which is connected to the ring gear of the second planetary gear set P2; the sun gear of the second planetary gear set P2 is connected to the third shaft 3, which is connected to the carrier of the third planetary gear set P3 and can be coupled, via a first brake 03, to the housing G of the transmission.

Furthermore, the ring gear of the fourth planetary gear set P4 is connected to the fourth shaft 4, which can be coupled, via a second brake 04, to the housing G of the transmission, wherein the output shaft 2 is connected to the carrier of the fourth planetary gear set P4 and is detachably connectable, via a fourth clutch 27, to the seventh shaft 7, which is connected to the ring gear of the first planetary gear set P1.

The first and second brakes 03, 04, viewed axially, can be disposed next to one another. In addition, the fourth clutch 27 and the second clutch 89, viewed axially, can be preferably disposed between the first planetary gear set P1 and the second planetary gear set P2.

FIG. 2 shows an example of a shift pattern of a multi-stage transmission according to FIG. 1. Four shift elements are engaged for every gear. The shift pattern shows, as examples, the particular transmission ratios i of the individual gear steps, and, to be determined therefrom, the gear increments or step changes φ to the next higher gear, wherein the value 8.992 is the transmission ratio spread.

Typical values for the stationary transmission ratios of the planetary gear sets P1, P2, P3 and P4 implemented as minus planetary gear sets are −2.292, −1.600, −1.600 and −2.449, respectively. FIG. 2 shows that only one shift element must be engaged and only one shift element must be disengaged in each case when shifting sequentially since two adjacent gear steps share three shift elements. It is also shown that a large transmission ratio spread is attained with small gear increments.

The first forward gear is obtained by engaging the first and second brakes 03, 04 and the second and third clutches 89, 16, the second forward gear is obtained by engaging the second brake 04 and the first, second, and third clutches 58, 89, 16, the third forward gear is obtained by engaging the second brake 04 and the second, third, and fourth clutches 89, 16, 27, the fourth forward gear is obtained by engaging the second brake 04 and the first, second, and fourth clutches 58, 89, 27, the fifth forward gear is obtained by engaging the second brake 04 and the first, third, and fourth clutches 58, 16, 27, the sixth forward gear, which is implemented as direct drive, is obtained by engaging all the clutches 16, 27, 58, 89, the seventh forward gear is obtained by engaging the first brake 03 and the first, third, and fourth clutches 58, 16, 27, the eighth forward gear is obtained by engaging the first brake 03 and the first, second, and fourth clutches 58, 89, 27 and the ninth forward gear is obtained by engaging the first brake 03 and the second, third, and fourth clutches 89, 16, 27, wherein the reverse gear is obtained by engaging the first and second brakes 03, 04 and the first and third clutches 58, 16.

Since the first and second brakes 03, 04 and the third clutch 16 are engaged in the first forward gear and in the first reverse gear, these shift elements can be used as start-up elements.

According to the invention, different gear increments also result from the same gear pattern depending on the shift logic, thereby making it possible to obtain an application-specific or vehicle-specific variation.

According to the invention, it is possible to provide additional freewheels at each suitable location of the multi-stage transmission, for example, between a shaft and the housing, or possibly to connect two shafts.

According to the invention, an axle differential and/or a distributor differential can be disposed on the drive side or on the output side.

Within the scope of an advantageous development, the drive shaft 1 can be separated from a drive motor, as needed, by a clutch element, wherein a hydrodynamic converter, a hydraulic clutch, a dry start-up clutch, a wet start-up clutch, a magnetic powder clutch, or a centrifugal clutch can be used as the clutch element. It is also possible to dispose such a start-up element downstream of the transmission in the direction of power flow, wherein, in this case, the drive shaft 1 is permanently connected to the crankshaft of the engine.

The multi-stage transmission according to the invention also makes it possible to dispose a torsional-vibration damper between the drive motor and the transmission.

Within the scope of a further embodiment of the invention, not depicted herein, a wear-free brake, for instance, a hydraulic or electric retarder or the like, can be disposed on each shaft, preferably on the drive shaft 1 or the output shaft 2, which is of special significance for use in commercial vehicles, in particular. Furthermore, a power take-off drive can be provided on each shaft, preferably on the drive shaft 1 or the output shaft 2, for driving additional assemblies.

The friction shift elements that are used can be designed as power-shiftable clutches or brakes. In particular, force locking clutches or brakes can be used, such as lamellar clutches, band brakes, and/or cone clutches, for example.

A further advantage of the multi-stage transmission presented here is that an electric machine can be attached to each shaft as a generator and/or as an additional drive machine.

REFERENCE CHARACTERS 1 first shaft, drive shaft
2 second shaft, output shaft
3 third shaft
4 fourth shaft
5 fifth shaft
6 sixth shaft
7 seventh shaft
8 eighth shaft
9 ninth shaft
03 first brake
04 second brake
16 third clutch
27 fourth clutch
58 first clutch
89 second clutch
P1 first planetary gear set
P2 second planetary gear set
P3 third planetary gear set
P4 fourth planetary gear set
i transmission ratio
φ step change
G housing

The invention claimed is:

1. A multi-stage transmission of a planetary design for a motor vehicle, the transmission comprising:
a drive shaft (1),
an output shaft (2),
a housing (G),
a first planetary gear set (P1), a second planetary gear set (P2), a third planetary gear set (P3), and a fourth planetary gear set (P4), each of the first, the second, the third, and the fourth planetary gear sets comprising: a sun gear, a carrier, and a ring gear,
a plurality of rotatable shafts (1, 2, 3, 4, 5, 6, 7, 8, 9),
a plurality of shift elements (03, 04, 16, 27, 58, 89), the plurality of shift elements comprising brakes (03, 04) and clutches (16, 27, 58, 89) whose selective engagement produces different transmission ratios between the drive shaft (1) and the output shaft (2),
wherein the sun gear of the first planetary gear set (P1) is directly connected to a fifth shaft (5), the fifth shaft (5) is connected to the ring gear of the third planetary gear set (P3) and the fifth shaft (5) is detachably connectable, via a first clutch (58), to an eighth shaft (8),
the eighth shaft (8) is connected to the carrier of the second planetary gear set (P2) and the eighth shaft (8) is detachably connectable, via a second clutch (89), to a ninth shaft (9),
the ninth shaft (9) is directly connected to both the sun gear of the third planetary gear set (P3) and the sun gear of the fourth planetary gear set (P4),
the drive shaft (1) is directly connected to the carrier of the first planetary gear set (P1) and the drive shaft (1) is also directly connected, upon engagement of a third clutch (16), to both a sixth shaft (6) and the ring gear of the second planetary gear set (P2),
the sun gear of the second planetary gear set (P2) is directly connected to a third shaft (3), and the third shaft (3) is directly connected to the carrier of the third planetary gear set (P3) and the third shaft (3) is connectable, via a first brake (03), to the housing (G) of the transmission,
the ring gear of the fourth planetary gear set (P4) is directly connected to a fourth shaft (4) and the fourth shaft (4) is connectable, via a second brake (04), to the housing (G) of the transmission, and
the output shaft (2) is directly connected to the carrier of the fourth planetary gear set (P4) and the output shaft (2) is directly connectable, via a fourth clutch (27), to a seventh shaft (7), and the seventh shaft (7) is directly connected to the ring gear of the first planetary gear set (P1).

2. The multi-stage transmission according to claim 1, wherein the multi-stage transmission comprises nine rotatable shafts and six shift elements which comprises two brakes and four clutches.

3. The multi-stage transmission according to claim 1, wherein the first, the second, the third and the fourth planetary gear sets (P1, P2, P3, P4) are each minus planetary gear sets.

4. The multi-stage transmission according to claim 2, wherein the first, the second, the third and the fourth planetary gear sets (P1, P2, P3, P4) are each minus planetary gear sets.

5. The multi-stage transmission according to claim 1, wherein
a first forward gear is achieved by engaging the first and the second brakes (03, 04) and the second and the third clutches (89, 16);
a second forward gear is achieved by engaging the second brake (04) and the first, the second and the third clutches (58, 89, 16);
a third forward gear is achieved by engaging the second brake (04) and the second, the third, and the fourth clutches (89, 16, 27);
a fourth forward gear is achieved by engaging the second brake (04) and the first, the second, and the fourth clutches (58, 89, 27);
a fifth forward gear is achieved by engaging the second brake (04) and the first, the third, and the fourth clutches (58, 16, 27);
a sixth forward gear is achieved by engaging the first, he second, the third, and the fourth clutches (16, 27, 58, 89);
a seventh forward gear is achieved by engaging the first brake (03) and the first, the third, and the fourth clutches (58, 16, 27);
an eighth forward gear is achieved by engaging the first brake (03) and the first, the second, and the fourth clutches (58, 89, 27);
a ninth forward gear is achieved by engaging the first brake (03) and the second, the third, and the fourth clutches (89, 16, 27); and
a reverse gear is achieved by engaging the first and the second brakes (03, 04) and the first and the third clutches (58, 16).

6. The multi-stage transmission according to claim 2, wherein
a first forward gear is achieved by engaging the first and the second brakes (03, 04) and the second and the third clutches (89, 16);
a second forward gear is achieved by engaging the second brake (04) and the first, the second and the third clutches (58, 89, 16);
a third forward gear is achieved by engaging the second brake (04) and the second, the third, and the fourth clutches (89, 16, 27);
a fourth forward gear is achieved by engaging the second brake (04) and the first, the second, and the fourth clutches (58, 89, 27);
a fifth forward gear is achieved by engaging the second brake (04) and the first, the third, and the fourth clutches (58, 16, 27);
a sixth forward gear is achieved by engaging the first, the second, the third, and the fourth clutches (16, 27, 58, 89);
a seventh forward gear is achieved by engaging the first brake (03) and the first, the third, and the fourth clutches (58, 16, 27);
an eighth forward gear is achieved by engaging the first brake (03) and the first, the second, and the fourth clutches (58, 89, 27);
a ninth forward gear is achieved by engaging the first brake (03) and the second, the third, and the fourth clutches (89, 16, 27); and
a reverse gear is achieved by engaging the first and the second brakes (03, 04) and the first and the third clutches (58, 16).

7. The multi-stage transmission according to claim 3, wherein
a first forward gear is achieved by engaging the first and the second brakes (03, 04) and the second and the third clutches (89, 16);
a second forward gear is achieved by engaging the second brake (04) and the first, the second and the third clutches (58, 89, 16);
a third forward gear is achieved by engaging the second brake (04) and the second, the third, and the fourth clutches (89, 16, 27);

a fourth forward gear is achieved by engaging the second brake (04) and the first, the second, and the fourth clutches (58, 89, 27);

a fifth forward gear is achieved by engaging the second brake (04) and the first, the third, and the fourth clutches (58, 16, 27);

a sixth forward gear is achieved by engaging the first, the second, the third, and the fourth clutches (16, 27, 58, 89);

a seventh forward gear is achieved by engaging the first brake (03) and the first, the third, and the fourth clutches (58, 16, 27);

an eighth forward gear is achieved by engaging the first brake (03) and the first, the second, and the fourth clutches (58, 89, 27);

a ninth forward gear is achieved by engaging the first brake (03) and the second, the third, and the fourth clutches (89, 16, 27); and a reverse gear is achieved by engaging the first and the second brakes (03, 04) and the first and the third clutches (58, 16).

8. The multi-stage transmission according to claim 4, wherein a first forward gear is achieved by engaging the first and the second brakes (03, 04) and the second and the third clutches (89, 16);

a second forward gear is achieved by engaging the second brake (04) and the first, the second and the third clutches (58, 89, 16);

a third forward gear is achieved by engaging the second brake (04) and the second, the third, and the fourth clutches (89, 16, 27);

a fourth forward gear is achieved by engaging the second brake (04) and the first, the second, and the fourth clutches (58, 89, 27);

a fifth forward gear is achieved by engaging the second brake (04) and the first, the third, and the fourth clutches (58, 16, 27);

a sixth forward gear is achieved by engaging the first, the second, the third, and the fourth clutches (16, 27, 58, 89);

a seventh forward gear is achieved by engaging the first brake (03) and the first, the third, and the fourth clutches (58, 16, 27);

an eighth forward gear is achieved by engaging the first brake (03) and the first, the second, and the fourth clutches (58, 89, 27);

a ninth forward gear is achieved by engaging the first brake (03) and the second, the third, and the fourth clutches (89, 16, 27); and a reverse gear is achieved by engaging the first and the second brakes (03, 04) and the first and the third clutches (58, 16).

9. A multi-stage transmission of a planetary design for a motor vehicle, the multi-stage transmission comprising:

a housing (G);

a first planetary gear set (P1), a second planetary gear set (P2), a third planetary gear set (P3), and a fourth planetary gear set (P4), each of the first, the second, the third, and the fourth planetary gear sets (P1, P2, P3, P4) comprising a sun gear, a carrier, and a ring gear;

a drive shaft (1), an output shaft (2) and third, fourth, fifth, sixth, seventh, eighth, and ninth rotatable shafts (3, 4, 5, 6, 7, 8, 9);

a plurality of shift elements (03, 04, 16, 27, 58, 89) comprising first and second brakes (03, 04) and first, second, third and fourth clutches (58, 89, 16, 27) whose selective engagement of which produces different transmission ratios between the drive shaft (1) and the output shaft (2);

the drive shaft (1) is directly connected to the carrier of the first planetary gear set (P1) and is directly connectable, via the third clutch (16), to the sixth shaft (6);

the output shaft (2) is continuously connected to the carrier of the fourth planetary gear set (P4) and is directly connectable, via the fourth clutch (27), to the seventh shaft (7);

the third shaft (3) is directly connected to both the sun gear of the second planetary gear set (P2) and the carrier of the third planetary gear set (P3) and the third shaft (3) is connectable, via the first brake (03), to the housing (G) of the transmission;

the fourth shaft (4) is directly connected to the ring gear of the fourth planetary gear set (P4) and is connectable, via the second brake (04), to the housing (G) of the transmission;

the fifth shaft (5) is directly connected to the sun gear of the first planetary gear set (P1) and the ring gear of the third planetary gear set (P3) and is connectable, via the first clutch (58), to the eighth shaft (8);

the sixth shaft (6) is directly connected to the ring gear of the second planetary gear set (P2);

the seventh shaft (7) is continuously connected to the ring gear of the first planetary gear set (P1);

the eighth shaft (8) is continuously connected to the carrier of the second planetary gear set (P2) and is connectable, via the second clutch (89), to the ninth shaft (9); and the ninth shaft is directly connected to both the sun gear of the third planetary gear set (P3) and the sun gear of the fourth planetary gear set (P4).

10. The multi-stage transmission according to claim 9, wherein a first forward gear is achieved by engaging the first and the second brakes (03, 04) and the second and the third clutches (89, 16);

a second forward gear is achieved by engaging the second brake (04) and the first, the second and the third clutches (58, 89, 16);

a third forward gear is achieved by engaging the second brake (04) and the second, the third, and the fourth clutches (89, 16, 27);

a fourth forward gear is achieved by engaging the second brake (04) and the first, the second, and the fourth clutches (58, 89, 27);

a fifth forward gear is achieved by engaging the second brake (04) and the first, the third, and the fourth clutches (58, 16, 27);

a sixth forward gear is achieved by engaging the first, the second, the third, and the fourth clutches (16, 27, 58, 89);

a seventh forward gear is achieved by engaging the first brake (03) and the first, the third, and the fourth clutches (58, 16, 27);

an eighth forward gear is achieved by engaging the first brake (03) and the first, the second, and the fourth clutches (58, 89, 27);

a ninth forward gear is achieved by engaging the first brake (03) and the second, the third, and the fourth clutches (89, 16, 27); and a reverse gear is achieved by engaging the first and the second brakes (03, 04) and the first and the third clutches (58, 16).

* * * * *